United States Patent
Yoshida (10) Patent No.: US 8,771,886 B2
(45) Date of Patent: *Jul. 8, 2014

(54) FUEL CELL SYSTEM AND METHOD FOR CONTROLLING SAME

(75) Inventor: Naohiro Yoshida, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1188 days.

This patent is subject to a terminal disclaimer.

(21) Appl. No.: 10/588,722

(22) PCT Filed: Mar. 16, 2005

(86) PCT No.: PCT/JP2005/005307
§ 371 (c)(1),
(2), (4) Date: Aug. 8, 2006

(87) PCT Pub. No.: WO2005/088757
PCT Pub. Date: Sep. 22, 2005

(65) Prior Publication Data
US 2008/0038608 A1 Feb. 14, 2008

(30) Foreign Application Priority Data
Mar. 17, 2004 (JP) ................. 2004-076552

(51) Int. Cl.
*H01M 8/06* (2006.01)
*H01M 8/18* (2006.01)

(52) U.S. Cl.
USPC ............... 429/415; 429/408; 429/428

(58) Field of Classification Search
USPC .................................. 429/12–46
See application file for complete search history.

(56) References Cited

U.S. PATENT DOCUMENTS

| | | | | |
|---|---|---|---|---|
| 4,859,545 A | * | 8/1989 | Scheffler et al. | 429/415 |
| 5,059,494 A | * | 10/1991 | Vartanian et al. | 429/415 |
| 5,441,821 A | | 8/1995 | Merritt et al. | |
| 7,105,243 B2 | * | 9/2006 | Morishima et al. | 429/25 |
| 2002/0094467 A1 | | 7/2002 | Nonobe et al. | |
| 2002/0098393 A1 | * | 7/2002 | Dine et al. | 429/13 |
| 2003/0012991 A1 | * | 1/2003 | Muehlherr et al. | 429/25 |
| 2003/0096145 A1 | * | 5/2003 | Sugawara et al. | 429/22 |
| 2003/0148167 A1 | * | 8/2003 | Sugawara et al. | 429/34 |
| 2008/0220303 A1 | * | 9/2008 | Yoshida | 429/25 |

FOREIGN PATENT DOCUMENTS

| | | | |
|---|---|---|---|
| DE | 10331261 A1 | * | 1/2004 |
| JP | B2 62-046951 | | 10/1987 |
| JP | A-9-283162 | | 10/1997 |
| JP | A 2000-081158 | | 3/2000 |

(Continued)

*Primary Examiner* — Barbara Gilliam
*Assistant Examiner* — Steven Scully
(74) *Attorney, Agent, or Firm* — Oliff PLC (57) ABSTRACT

The present invention provides a fuel cell system capable of accurately controlling the pressure of fuel gas supplied to the fuel cell, the fuel cell system comprising: a fuel gas supply line (SL) which supplies the fuel gas from a fuel gas supply source (11) to the fuel cell (10); pressure-regulating means (RG) provided on the fuel gas supply line (SL) and for regulating the pressure of the fuel gas supplied from the fuel gas supply source (11); and a circulation route (R) which returns the fuel gas discharged from the fuel cell (10) to the fuel gas supply line (SL), wherein the circulation route (R) is connected to the fuel gas supply line (SL) such that the fuel gas is returned thereto in the upstream of the pressure-regulating means (RG).

10 Claims, 4 Drawing Sheets

(56) References Cited

FOREIGN PATENT DOCUMENTS

| JP | A-2000-106206 | | 4/2000 | | |
| JP | B2 3349742 | | 9/2002 | | |
| JP | 2002-352837 | * | 12/2002 | .............. | H01M 8/04 |
| JP | 2002-373682 | * | 12/2002 | .............. | H01M 8/04 |
| JP | 2002-373683 | * | 12/2002 | .............. | H01M 8/04 |
| JP | A 2002-352837 | | 12/2002 | | |
| JP | A-2002-373682 | | 12/2002 | | |
| JP | A 2003-068334 | | 3/2003 | | |

* cited by examiner

FUEL CELL SYSTEM AND METHOD FOR CONTROLLING SAME

TECHNICAL FIELD

The present invention relates to a fuel cell system, and particularly, provides a configuration of a circulation route which is suitable for detection of gas leak and the like.

BACKGROUND ART

In order to improve controllability on the differential pressure between the electrodes in a fuel cell system, conventionally air pressure was supplied as signal pressure to a pressure-regulating valve. For example, Japanese Patent Application Laid-Open No. 2003-68334 discloses a circulation route in which hydrogen gas is depressurized and supplied to the anode of the fuel cell via the hydrogen gas supply line, and the hydrogen off-gas, which is discharged from the fuel cell, is pressurized by the hydrogen pump and thereafter returned to the hydrogen gas supply line in the downstream of the pressure-regulating valve. In this system, the pressure-regulating valve on the hydrogen gas supply line takes the air pressure, which is pressurized by a compressor supplying the air to the cathode, as signal pressure, and thereby regulates the valve opening degree.

DISCLOSURE OF INVENTION

Incidentally, in the prior technology a hydrogen pump or an ejector is used in order to return the hydrogen off-gas of the fuel cell to the hydrogen gas supply line. However, when a hydrogen pump, for example, is used, the discharge pressure sometimes contains fluctuation (pulsation) component depending on the structure of the pump. Furthermore, due to the presence of the components (the valve part, sensor, for example) connected to the structure or lines of the circulation route, pressure fluctuation (pulsation) sometimes occurs in the circulation route. For this reason, in the conventional technology, the hydrogen supply pressure, which is depressurized in the pressure-regulating valve, is affected by the pressure fluctuation of the returning hydrogen gas when the returning hydrogen gas from the circulation route is caused to flow with the hydrogen gas. As a result, the pressure of the hydrogen gas supplied to the fuel cell fluctuates, whereby power generation control becomes unstable.

An object of the present invention, therefore, is to provide a fuel cell system capable of accurately controlling the supply pressure of fuel gas supplied to the fuel cell.

In order to achieve the above object, the present invention comprises: a fuel gas supply line which supplies fuel gas from a fuel gas supply source to the fuel cell; pressure-regulating means provided on the fuel gas supply line and for regulating the pressure of the fuel gas supplied from the fuel gas supply source; and a circulation route which returns the fuel gas discharged from the fuel cell to the fuel gas supply line, wherein the circulation route is connected to the fuel gas supply line such that the fuel gas is returned thereto in the upstream of the pressure-regulating means.

According to the above configuration, although the fuel gas which is discharged from the fuel cell is returned to the fuel gas supply line via the circulation route, the circulation route is connected to the upstream of the pressure-regulating means. Therefore, even when pressure fluctuation (pulsation) occurs in the circulation route, the pressure-regulating means stabilizes the pressure in a downstream, thus minor fluctuation no longer occurs in the pressure of the fuel gas supplied to the fuel cell.

Here, no limitation is made to "fuel gas supply source", thus examples thereof include a high-pressure hydrogen tank, a hydrogen tank in which hydrogen absorption alloys are used, a hydrogen supply mechanism using reformed gas, a liquid hydrogen tank, a liquid fuel tank, and the like.

Although no limitation is made to "ressure-regulating means", a so-called pressure-regulating valve (regulator) for stabilizing the pressure in the downstream to desired pressure can be utilized.

Particularly the present invention is effective when the pressure-regulating means is configured in such a manner that the pressure of the fuel gas in the fuel gas supply line can be regulated using the pressure of oxidation gas supplied to the fuel cell. Specifically, the present invention comprises: an oxidation gas supply line for supplying oxidation gas supplied to the cathode of the fuel cell; oxidation gas supply means provided in the oxidation gas supply line and for pressurizing and supplying the oxidation gas to the cathode; cathode side pressure detection means for detecting the pressure of the oxidation gas supplied to the cathode of the fuel cell; anode side pressure detection means for detecting the pressure of the fuel gas supplied to the anode of the fuel cell; and control means for controlling the pressure of gas supplied to the fuel cell from at least either the fuel gas supply line and the oxidation gas supply line, so that the differential pressure between the oxidation gas detected by the cathode side pressure detection means and the fuel gas detected by the anode side pressure detection means becomes within a predetermined range.

Moreover, the present invention comprises the steps of: detecting the pressure of the oxidation gas supplied to the cathode of the fuel cell via the fuel gas supply line; detecting the pressure of the fuel gas supplied to the anode of the fuel cell via the oxidation gas supply line; and controlling the pressure of gas supplied to the fuel cell from at least either the fuel gas supply line and the oxidation gas supply line, so that the differential pressure between the detected oxidation gas and fuel gas becomes within the predetermined range.

According to the above-described invention, the control means changes the gas supply pressure in the fuel gas supply line or the oxidation gas supply line so that the differential pressure between the anode and the cathode is limited within the predetermined range, thus it is preferred because deterioration of an electrolyte membrane (MEA) caused in the fuel cell or gas cross leakage can be prevented.

Particularly, when the pressure-regulating means can control the pressure of the fuel gas by using the pressure of the oxidation gas, the pressure of the oxidation gas can affect the pressure of the fuel gas. Therefore, by using mechanical interactions to assist control of the control means, the differential pressure can be eliminated promptly.

Moreover, the present invention may be configured such that the control means controls at least either one of the oxidation gas supply means or the pressure-regulating means so that the differential pressure becomes within the predetermined range. According to the above configuration, the control means drive or stops the pressure means and controls increase and decrease of the amount regulated by the pressure-regulating means, whereby the differential pressure is controlled within the desired range.

Further, the present invention may comprise flowing means for flowing the fuel gas of the circulation route into the fuel gas supply line. By means of the flowing means with this configuration, the fuel gas is allowed to flow into the fuel gas supply line, whereby a regenerative fuel cell system is formed.

Here, as the "flowing means", a fuel gas pump provided on the circulation route is conceivable. Further, the "flowing means" may be an ejector provided in the junction point between the fuel gas supply line and the circulation route.

The cathode side pressure detection means may be configured so as to estimate and detect the pressure of the oxidation gas on the basis of the drive amount of the oxidation gas supply means. Similarly, the anode side pressure detection means may be configured so as to estimate and detect the pressure of the fuel gas on the basis of the drive amount of the flowing means.

Specifically, the pressure of the oxidation gas or the fuel gas may be measured by a measuring device such as a pressure sensor for directly detecting the pressure in the oxidation gas supply line or the fuel gas supply line. However, the drive amount of the oxidation as supply means or the fuel gas supply means (for example, the rotating speed or electrical power consumption, in the case of a pump or compressor) correlates with the pressure of the oxidation gas or fuel gas, thus the pressure of the oxidation gas or fuel gas can be computed and estimated on the basis of the drive amount.

Here, oxidation gas pressure-regulating means, which is capable of controlling the pressure of the oxidation gas supplied to the pressure-regulating means independently from the oxidize gas in the cathode side, is preferably provided, wherein when the pressure of the fuel gas is larger than the pressure of the oxidation gas, and thus the differential pressure therebetween is outside the predetermined range, the oxidation gas pressure-regulating means depressurizes the oxidation gas supplied to the pressure-regulating means, as a result of which the fuel gas in the anode side, which is regulated by the pressure-regulating means, is depressurized, whereby the differential pressure is reduced. According to this configuration, since the oxidation gas supplied to the pressure-regulating means is depressurized by the oxidation gas pressure-regulating means, the pressure of the fuel gas supplied to the anode side is also reduced, whereby the differential pressure is reduced.

It should be noted that the "oxidation gas pressure-regulating means" is the means capable of increasing and decreasing the pressure of the oxidation gas applied to the pressure-regulating means, and, although not particularly limited, is also a combination of, for example, valve means for limiting supply of the oxidation gas from the cathode side and valve means for depressurizing the oxidation gas applied to the pressure-regulating means.

Moreover, when the pressure of the fuel gas is larger than the pressure of the oxidation gas, and thus the differential pressure therebetween is outside the predetermined range, the oxidation gas supply means pressurizes the oxidation gas supplied to the cathode side to reduce the differential pressure. According to the above configuration, since the relatively small pressure of the oxidation gas rises, the differential pressure can be eliminated.

Furthermore, when comprising purge means for purging the fuel gas in the circulation route, in the case in which the pressure of the fuel gas is larger than the pressure of the oxidation gas, and thus the differential pressure therebetween is outside the predetermined range, the purge means may depressurize the fuel gas in the anode side to reduce the differential pressure. According to this configuration, since the pressure of the fuel gas is directly reduced by the purge means, the differential pressure can be eliminated.

Moreover, the oxidation gas pressure-regulating means, which is capable of controlling the pressure of the oxidation gas supplied to the pressure-regulating means independently from the oxidize gas in the cathode side, may be provided, wherein when the pressure of the oxidation gas is larger than the pressure of the fuel gas, and thus the differential pressure therebetween is outside the predetermined range, the oxidation gas pressure-regulating means pressurizes the oxidation gas supplied to the pressure-regulating means, as a result of which the fuel gas in the anode side, which is regulated by the pressure-regulating means, is pressurized, whereby the differential pressure is reduced. According to this configuration, since the oxidation gas supplied to the pressure-regulating means is pressurized by the oxidation gas pressure-regulating means, the pressure of the fuel gas supplied to the anode side is also increased, whereby the differential pressure is reduced.

Furthermore, when the pressure of the oxidation gas is larger than the pressure of the fuel gas, and thus the differential pressure therebetween is outside the predetermined range, the oxidation gas supplied to the cathode side may be depressurized by the oxidation gas supply means so that the differential pressure is reduced. According to this configuration, by suppressing pressurization of the oxidation gas supply means, the differential pressure is directly eliminated.

BEST MODE FOR CARRYING OUT THE INVENTION

Preferred embodiments for carrying out the present invention are described next with reference to the drawings.

In the embodiments of the present invention the present invention is applied to a fuel cell system loaded in a moving body of an electric vehicle and the like. The embodiments described hereinafter are merely a mode of the present invention, thus the present invention is applicable without limitation thereto.

Figure 1:
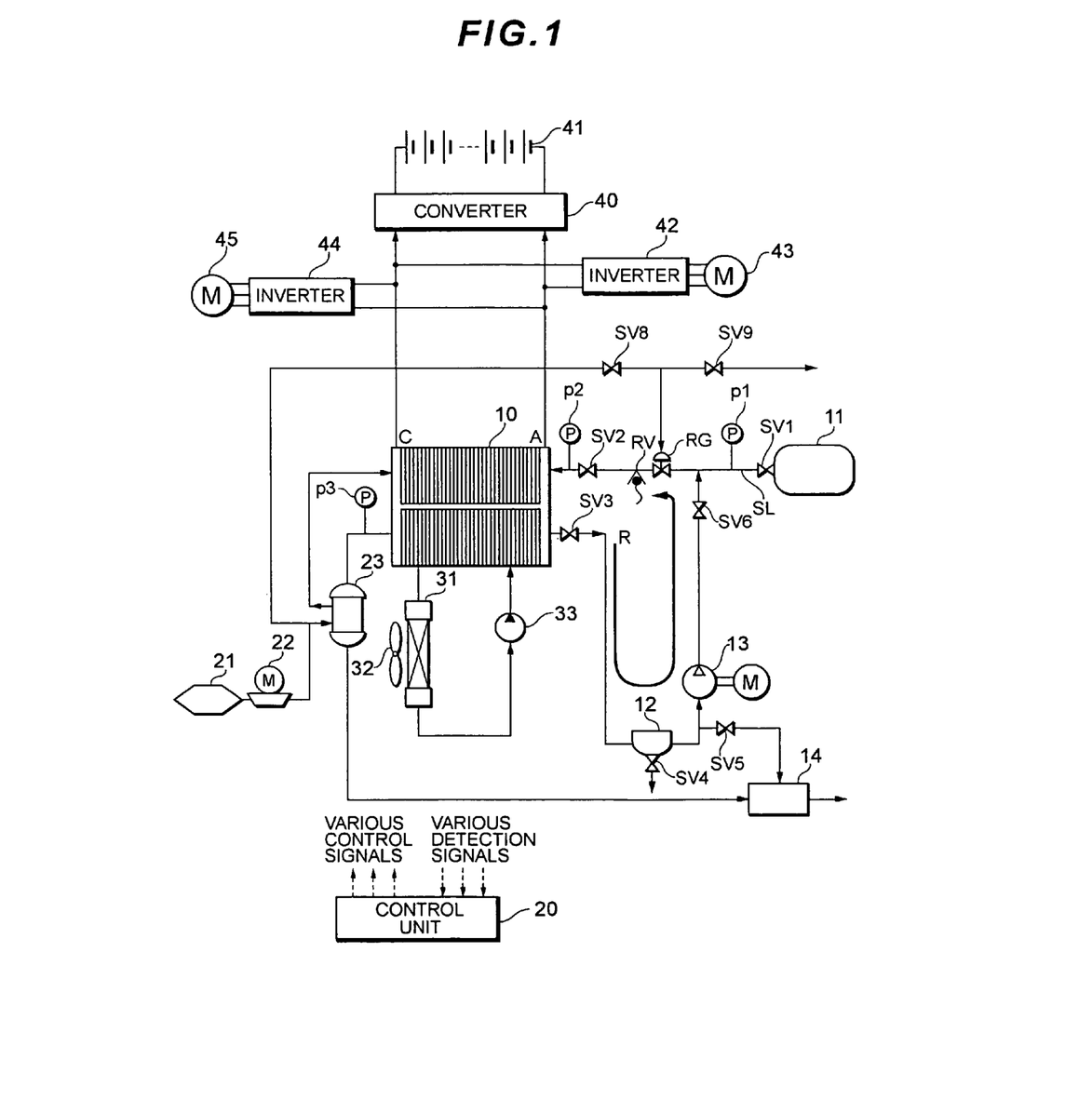
FIG. 1 is a block diagram of a fuel cell system according to the present embodiment.

FIG. 1 shows a figure of the entire system of the present fuel cell system. As shown in FIG. 1, this fuel cell system comprises a system for supplying hydrogen gas, which is fuel gas, to a fuel cell stack 10, a system for supplying air as oxidation gas, and a system for cooling the fuel cell stack 10.

The fuel cell stack 10 has a stack structure in which a plurality of cells are stacked, the cell being constituted by a separator having channels for hydrogen gas, air, and cooling water, and a MEA (membrane electrode assembly) held between a pair of separators. The MEA has a structure in which a polymer electrolyte membrane is held between the two electrodes of anode electrode (fuel electrode) and cathode electrode (air electrode). The anode electrode is configured such that an anode catalyst layer is provided on a porous layer, while the cathode electrode is configured such that a cathode catalyst layer is provided on a porous layer. Since the fuel cell generates the reverse reaction of electrolysis of water, thus hydrogen gas as fuel gas is supplied to the anode electrode which is a negative electrode, oxidation gas (air) containing oxygen is supplied to the cathode electrode which is a positive electrode, a reaction shown in Equation (1) is caused in the anode electrode, and a reaction shown in Equation (2) is caused in the cathode electrode, whereby the electrons are circulated to pass an electric current.

$$H_2 \rightarrow 2H^+ + 2e^- \tag{1}$$

$$2H^+ + 2e^- + (1/2)O_2 \rightarrow H_2O \tag{2}$$

The system for supplying hydrogen gas to the fuel cell stack 10 comprises, on a hydrogen gas supply line SL extending from a hydrogen tank 11, which is equivalent to the fuel gas supply source of the present invention, to the fuel cell stack 10, a source valve (a tank on-off valve or a tank shutoff valve) SV1, a pressure-regulating valve RG equivalent to the pressure-regulating means of the present invention, and a fuel cell inlet shutoff valve SV2, wherein a pressure sensor p1 can measure the path pressure of the hydrogen gas supply line SL in an upper portion of the pressure-regulating valve RG, and a pressure sensor p2 can measure the hydrogen gas supply pressure in the fuel cell stack 10.

Further, a circulation route R extending from an outlet of the fuel cell stack 10 comprises a fuel cell outlet shutoff valve SV3, a gas-liquid separator 12, a shutoff valve for gas-liquid separator SV4, a hydrogen pump 13, and a circulation route shutoff valve SV6. An upstream of the hydrogen pump 13 is provided with a discharge path for hydrogen off-gas, and a purge shutoff valve SV5 is provided on the discharge path.

The hydrogen tank 11 is filled with high-pressure hydrogen gas. As a hydrogen tank, besides a high-pressure hydrogen tank, a hydrogen tank in which hydrogen absorption alloys are used, a hydrogen supply mechanism using reformed gas, a liquid hydrogen tank, a liquid fuel tank, and various other hydrogen tanks are applicable. Opening and closing of the source valve SV1 is controlled by a control signal of a control unit 20, and whether to supply hydrogen gas to a supply line or to shut off the valve is selected.

The pressure-regulating valve RG is, for example, a known bypass type regulating valve or diaphragm type regulating valve for introducing signal pressure (see Japanese Patent Application Laid-Open No. 2003-68334), which is configured such that air pressure in the downstream of the cathode electrode compressor 22 is introduced into a signal pressure chamber, whereby the high-pressure hydrogen gas from the hydrogen tank 11 is regulated (depressurized) to be lower than the tank internal pressure.

Figure 3A:
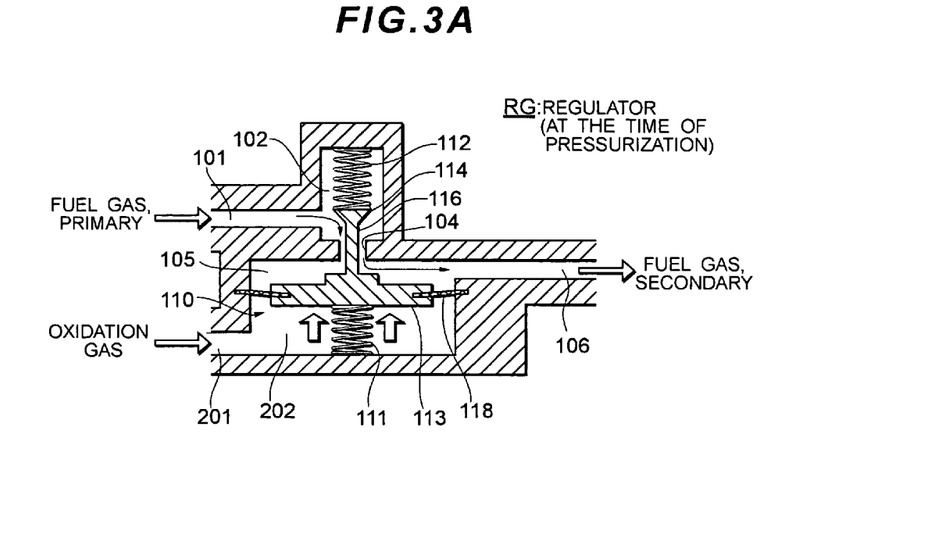
FIG. 3A is a cross-sectional diagram of a regulator (pressure-regulating means) at the time of fuel gas pressurization.
Figure 3B:
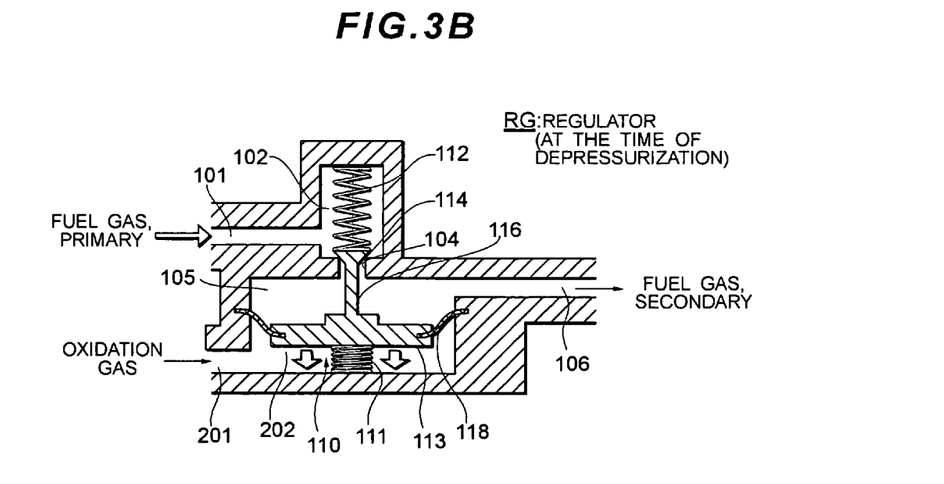
FIG. 3B is a cross-sectional diagram of the regulator (pressure-regulating means) at the time of fuel gas depressurization.

An example of the pressure-regulating valve RG used in the present embodiment is described with reference to FIG. 3A and FIG. 3B. FIG. 3A shows a state in which secondary fuel gas pressure is raised, while FIG. 3B shows a state in which the secondary fuel gas pressure is lowered.

This pressure-regulating valve RG is configured such that the valve opening is controlled by regulating a movable puppet 110 using a biasing force of a spring and ambient pressure by means of a diaphragm. Specifically, the pressure-regulating valve RG comprises a spring chamber 102 into which the fuel gas flows from an outlet side (primary) fuel gas supply line 101, a communication line 104, and a diaphragm chamber 105 into which the pressure-regulated fuel gas flows, wherein the pressure-regulated fuel gas is discharged to an outlet side (secondary) fuel gas supply line 106. The flow rate of the fuel gas flowing into the spring chamber 102 is controlled by vertical movement of the puppet 110 inserted into the communication line 104. In this puppet 110, a tapered puppet head 114 disposed on the spring chamber 102 side is connected to a main body 113 disposed in the diaphragm 105, through a puppet axis 116 inserted into the communication line 104. The diaphragm chamber 105 is partitioned by a flexible diaphragm 118 provided on a periphery of the main body 113 of the puppet. The upper side of the diaphragm 118 is a space for flowing the fuel gas, and the lower side of same is an air chamber 202 into which air flows. Due to this flexibility of the diaphragm 118, the puppet 110 can freely reciprocate via the communication line 104. The puppet 110 is supported by a spring 112 provided in the spring chamber 102 and a pressure-regulating spring 111 provided in the diaphragm chamber 105.

In the above configuration, when the air is supplied and the pressure in the air chamber 202 becomes relatively high, the puppet 110 is pushed upward by the pressure applied to the diaphragm 118 and the puppet 110, whereby the puppet head 114 separates from the communication line 104. Accordingly, the high-pressure fuel gas from the inlet side fuel gas supply line 101 flows into the diaphragm chamber 105 through a gap between the communication line 104 and the puppet axis 116 and is supplied to the outlet side fuel gas supply line 106, and the pressure of the fuel gas supplied to the fuel cell stack 10 is raised.

Further, when the supply pressure of the air decreases and the pressure in the air chamber 202 becomes relatively low, the pressure applied to the diaphragm 118 and the puppet 110 is reduced, and as a result, the biasing force of the spring 112 increases, whereby the puppet head 114 is pressed downward. Accordingly, the puppet head 114 moves in a direction so as to block the communication line 104, and the area of the communication line 104 through which the fuel gas flow from the inlet side fuel gas supply line 101 is narrowed down. Therefore, the flow rate of the fuel gas flowing into the diaphragm chamber 105 is reduced, and the pressure of the fuel gas supplied to the outlet side fuel gas supply line 106 also decreases.

Here, as shown in FIG. 1, the pressure of the air supplied to the pressure-regulating valve RG is defined on the basis of the air pressure on the cathode electrode side, which is defined based on the drive amount of the compressor 22, that is, on the basis of control of the shutoff valves SV8 and SV9 which are equivalent to the oxidation gas pressure-regulating means of the present invention. Specifically, the pressure on the outlet side of the pressure-regulating valve RG is regulated by the control unit 20 driving the compressor 22 and the operation on the shutoff valves SV8 and SV9. For example, by opening the shutoff valve SV8, the pressure of the air supplied to the pressure-regulating valve RG is raised and the outlet side pressure of the regulating valve RG is raised, and by opening the shutoff valve SV9, the pressure of the air supplied to the pressure-regulating valve RG is reduced and the outlet pressure of the pressure-regulating valve RG is reduced. The fuel cell inlet shutoff valve SV2 is closed on the basis of the control signal of the control unit 20, when the power generation of the fuel cell is closed.

The gas-liquid separator 12 is for eliminating moisture and other impurities generated by the electrochemical reaction of the fuel cell stack 10 at the time of normal operation, from the hydrogen off-gas, and discharging them to the outside through the shutoff valve SV4.

The purge shutoff valve SV5 is connected to the circulation route R, and opened not only when purging but also when the power generation is stopped, to reduce the pressure inside the circulation route R. The hydrogen off-gas discharged from the purge shutoff valve SV5 is supplied to a dilution device 14 and diluted by air off-gas.

The hydrogen pump 13 forcibly causes the hydrogen off-gas to circulate in the hydrogen gas supply line (the inlet side of the fuel cell stack 10) on the basis of the control signal of the control unit 20.

The circulation route shutoff valve SV6 is shut off when the power generation is stopped, but is opened when the fuel cell is operated, in order to supply the hydrogen off-gas to the fuel cell stack 10. It should be noted that a return check valve may be provided instead of the circulation route shutoff valve SV6.

The system for supplying air to the fuel cell stack 10 comprises an air cleaner 21, the compressor 22, and a humidifier 23. The air cleaner 21 purifies the air and introduces the purified air to the fuel cell system. The compressor 22 pressurizes the introduced air on the basis of the control signal of the control unit 20, and thereby changes the amount or pressure of the air supplied to the fuel cell stack 10.

The humidifier 23 performs exchange of moisture between the pressurized air and the air off-gas to add appropriate humidity. Part of the air pressurized by the compressor 22 is supplied to the signal pressure chamber of the pressure-regulating valve RG to control the pressure-regulating valve RG of the fuel system, and the air pressure in a section between the shutoff valves SV8 and SV9 is applied to the diaphragm of the pressure-regulating valve RG. The air off-gas discharged from the fuel cell stack 10 is supplied to the dilution device 14 and diluted.

The cooling system of the fuel cell stack 10 comprises a radiator 31, a cooling fan 32, and a cooling pump 33, and the cooling water is circulated and supplied inside the fuel cell stack 10.

In the fuel cell stack 10 single cells are connected in series or in parallel, and a predetermined voltage (for example, 500V) is generated between the anode A and cathode C. A converter 40 is inserted between the fuel cell stack 10 and a secondary battery 41 provided as an aid in electric power supply in the fuel cell stack 10. The voltage from the secondary battery 41 is converted (raised) so that the secondary battery 41 can be connected to the fuel cell stack 10, and the electric power of the secondary battery 41 is made available as the auxiliary power of the fuel cell stack 10. On the other hand, when the electric power from the fuel cell stack 10, from a three-phase motor 43, and from an auxiliary motor 45 is excessively high, the voltage of the fuel cell stack 10 is converted (lowered), and the excessive electric power is supplied to the secondary battery 41. An inverter 42 changes direct-current power to three-phase current and supplies it to the three-phase motor 42. The three-phase motor 43 is connected to a wheel in the case of, for example, the present embodiment, and is a major source of electricity consumption. However, in the case of a light load, the three-phase motor 43 can supply regenerative electric power to the secondary battery 41 via the inverter 42 and converter 40. An inverter 44 also changes direct-current power to alternating-current power to drive the auxiliary motor 45. The auxiliary motor 45 is drive means of, for example, the hydrogen pump 13, compressor 22, fan 32, a cooling water pump 33 and the like shown in FIG. 1.

The control unit 20 is a known computer system such as an ECU (Electric Control Unit), and can be operated as a fuel gas system of the present invention by an unshown CPU (central processing unit) executing sequentially software programs for implementing the present invention, which are stored in an unshown ROM and the like. Specifically, through the procedure (FIG. 2) described hereinafter, the control unit 20 controls the differential pressure, which is generated between the anode electrode and the cathode electrode of the fuel cell stack 10, such that the differential pressure is held within a predetermined range.

It should be noted that, although no limitation is made to the structure of each of the above shutoff valves, for example, a pilot-operated shutoff valve is used. It is because high sealing characteristics can be expected from this type of valve by closing the valve while reducing the downstream pressure. In this type of valve, supply of current to the solenoid is stopped when the valve is closed, and the valve is opened at the speed which is defined by the balance between the residual flux and the force of the spring. Although the strength of the sealing at this moment depends on the biasing force of the spring, if the downstream pressure of the valve is small, strong force is applied to the valve body by the amount of the differential pressure between the front and back of the valve, whereby the sealing reliability is improved.

Figure 4:
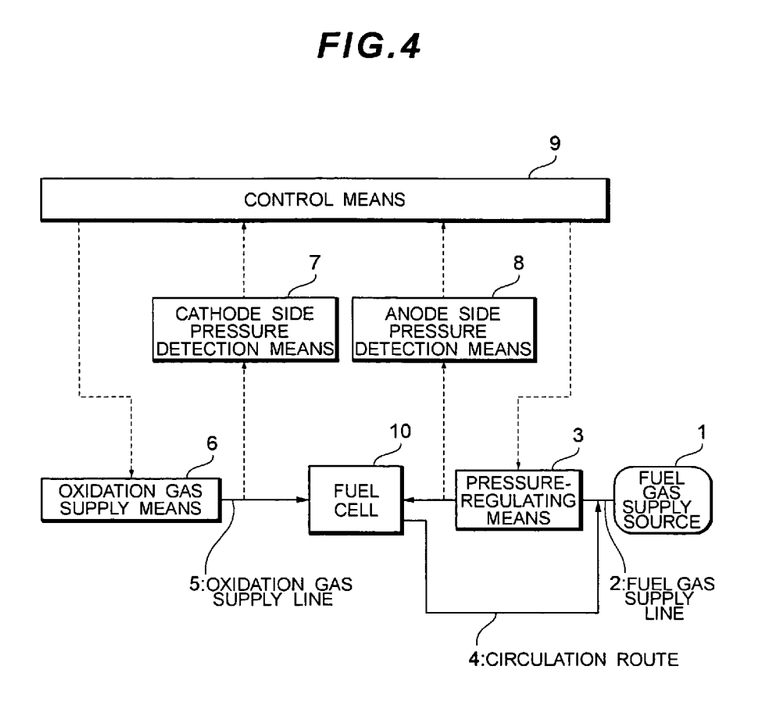
FIG. 4 is a functional block diagram according to the present invention.

By using the functional block diagram of FIG. 4, the configurations of the abovementioned embodiments are compared with the configuration of the present invention.

As shown in FIG. 4, first of all, the present invention comprises a fuel gas supply line 2 (equivalent to the fuel gas supply line SL) for supplying fuel gas from a fuel gas supply source 1 (equivalent to the hydrogen tank 11) to the fuel cell 10, pressure-regulating means 3 (equivalent to the pressure-regulating valve RG) provided in the fuel gas supply line 2 and for regulating the pressure of the fuel gas supplied from the fuel gas supply source 1, and a circulation route 4 (equivalent to the circulation route R) for returning the fuel gas discharged from the fuel cell 10 to the fuel gas supply line. The circulation route 4 is characterized in being connected to the fuel gas supply line 2 such that the fuel gas is returned thereto in the upstream of the pressure regulating means 3.

Secondly, the present invention is configured in such a manner that the pressure-regulating means 3 can regulate the pressure of the fuel gas in the fuel gas supply line 2 by using the pressure of oxidation gas supplied to the fuel cell, and the present invention comprises: an oxidation gas supply line 5 (equivalent the air circuit) for supplying oxidation gas supplied to the cathode of a fuel cell 10; oxidation gas supply means 6 (equivalent to the compressor 22) provided in the oxidation gas supply line 5 and for pressurizing and supplying the oxidation gas to the cathode; cathode side pressure detection means 7 (equivalent to the pressure sensor p3) for detecting the pressure of the oxidation gas supplied to the cathode of the fuel cell 10; anode side pressure detection means 8 (equivalent to the pressure sensor p2) for detecting the pressure of the fuel gas supplied to the anode of the fuel cell 10; and control means 9 (equivalent to the control unit 20) for controlling the pressure of gas supplied to the fuel cell 10 from at least either the fuel gas supply line (circulation route) 2 and the oxidation gas supply line 5, so that the differential pressure between the oxidation gas detected by the cathode side pressure detection means 7 and the fuel gas detected by the anode side pressure detection means 8 becomes within a predetermined range. More specifically, the operation of this configuration is realized in the flowchart of FIG. 2.

Figure 2:
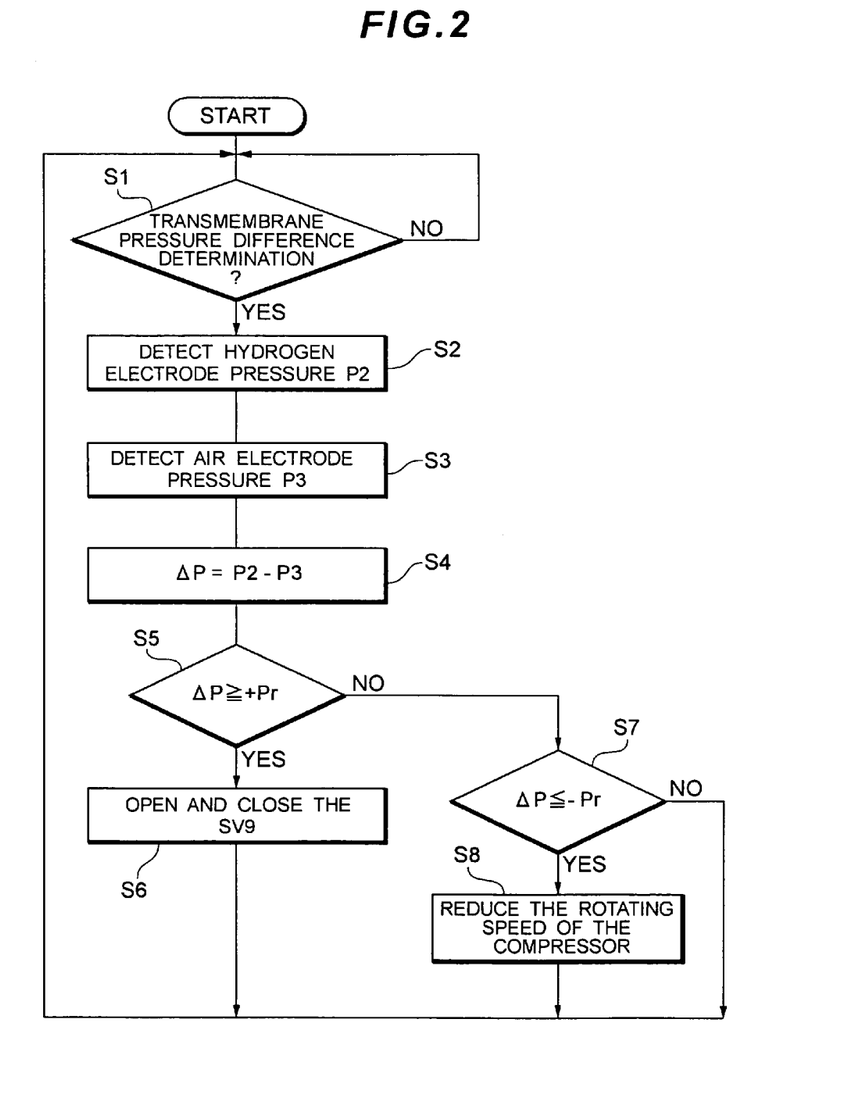
FIG. 2 is a flowchart for explaining the control method of the fuel cell system of the present embodiment.

Next, the operation of the present embodiment is described with reference to the flowchart of FIG. 2. When the fuel cell system is in an operating state, the flowchart is repeatedly executed at appropriate intervals while the fuel cell system is powered on.

Transmembrane pressure difference determination is carried out in the present invention. Here, transmembrane pressure difference determination is for determining the differential pressure between the hydrogen gas pressure on the anode electrode side and the air pressure on the cathode electrode side, those electrodes being the electrodes on both sides of the polymer electrolyte membrane of the fuel cell. Other processes are performed at other timings when the transmembrane pressure difference determination of the present invention is not performed (S1: NO), and when the time for the transmembrane pressure difference determination comes (S1: YES), the control unit 20 obtains the pressure of the air applied to the cathode electrode of the fuel cell stack 10 and the pressure of the hydrogen gas applied to the anode electrode. Specifically, the control unit 20 specifies hydrogen gas supply pressure P2 with reference to a detection signal from the pressure sensor p2 (S2). Similarly, the control unit 20 specifies air pressure P3 with reference to a detection signal from the pressure sensor p3 (S3).

It should be noted that although the pressures inside the lines are measured by the pressure sensors here, values corresponding to the air or hydrogen gas may be obtained by means of other method. For example, the pressure of the air supplied to the cathode electrode can be estimated by using a data table or computation from the rotating speed of the compressor or the supply power, since the air pressure is in a close correlation with the rotating speed of the compressor 22. Moreover, the pressure of the hydrogen gas supplied to the anode electrode can be substantially determined by the pressure-regulating valve RG which is regulated by the opening and closing control of the shutoff valves SV8 and SV9 performed by the control unit 20. Therefore, the pressure of the hydrogen gas may be estimated from the regulated amount of the pressure-regulating valve RG.

Once the hydrogen gas supply pressure P2 on the anode electrode side of the fuel cell stack 10 and the air pressure P3 on the cathode electrode side are measured, the control unit 20 computes the difference therebetween to output a differential pressure $\Delta P$ (S4). The differential pressure $\Delta P$ at this moment can be a positive value or a negative value depending on the magnitude relation between the hydrogen gas supply pressure P2 and the air pressure P3.

Next, the control unit 20 determines whether the differential pressure $\Delta P$ is within a predetermined pressure range $\pm Pr$ (S5/S7). This pressure range can be set by various conditions and is a differential pressure which is preferred in an operation state of the fuel cell. If the differential pressure is large, deterioration of the polymer electrolyte membrane, which affects the reliability of the fuel cell, occurs or cross leakage of the hydrogen gas tends to increase. However, since a limiting value of the differential pressure is obtained for each polymer electrolyte membrane, the range of the differential pressure can be set to a range between the limiting value and a value with allowance.

First, when the differential pressure $\Delta P$ is a positive value, that is, the pressure of the hydrogen gas on the anode electrode side is larger, and thus the differential pressure with the cathode electrode side exceeds Pr (S5: YES), the differential pressure needs to be reduced. For this reason, the control unit 20 opens and closes the shutoff valve SV9 to reduce the pressure of the air applied to the diaphragm of the pressure-regulating valve RG and reduce the supply pressure of the hydrogen gas (S6). Further, the supply pressure of the hydrogen gas on the anode electrode side can be reduced temporarily by opening and closing the purge shutoff valve. However, when the amount of the hydrogen off-gas to be purged is excessively large, the air to be diluted by the dilution device 14, thus the purged amount is regulated so that it does not become excessively large.

It should be noted that the differential pressure $\Delta P$ is reduced by raising the pressure on the cathode electrode side, thus, when the supply pressure of the hydrogen gas cannot be reduced from the perspective of the maintained output and the like, the control unit 20 outputs a control signal so as to increase the rotating speed of the compressor 22 and raise the air pressure. Of course, the differential pressure can be reduced faster by raising the pressure on the cathode electrode side in parallel with reduction of the supply pressure of the hydrogen gas on the anode electrode side.

On the other hand, when the differential pressure $\Delta P$ is a negative value, that is, the pressure on the cathode electrode side is larger, and thus the differential pressure with the anode electrode side exceeds Pr (S7: YES), it is necessary to eliminate the differential pressure by means of a method which is contrary to the one in the step S5. The differential pressure $\Delta P$ can be reduced by reducing the pressure on the cathode electrode side, thus, the control unit 20 outputs a control signal so as to reduce the rotating speed of the compressor 22 (S8).

It should be noted that the differential pressure $\Delta P$ can be reduced by raising the supply pressure of the hydrogen gas on the anode electrode side, thus, instead of changing the rotating speed of the compressor 22, the shutoff valve SV8 may be opened and closed to raise the pressure of the air applied to the diaphragm of the pressure-regulating valve RG and raise the supply pressure of the hydrogen gas (S9).

Of course, the differential pressure may be reduced faster by raising the supply pressure of the hydrogen gas on the anode electrode side in parallel with reduction of the air pressure on the cathode electrode side.

When the differential pressure $\Delta P$ is within the predetermined pressure range $\pm Pr$ (S5: NO; S7: NO), the control unit 20 determines that pressure control in the fuel cell stack 10 is performed smoothly, and proceeds to other process.

In the above configuration, when the hydrogen pump 13 is driven, pulsation is generated in the output pressure thereof, and, when each of the shutoff valves is opened, such pulsation extends to the hydrogen gas supply line SL. However, according to the present embodiment, since the connecting point between the circulation route R and the hydrogen gas supply line SL is positioned in the upstream of the pressure-regulating valve RG, the pressure-regulating valve RG eases the pulsation, thus the supply pressure of the hydrogen gas supplied to the fuel cell stack 10 can be extremely stabilized.

According to the present embodiment, the differential pressure between the anode electrode side and the cathode electrode side of the fuel cell stack 10 is further controlled to be equal to or less than the predetermined range $\pm Pr$ on the basis of the stabilized supply pressure of the hydrogen gas, thus cross leakage can be prevented as much as possible, and deterioration of the polymer electrolyte membrane, which is caused by excessively large differential pressure, can be suppressed.

According to the present embodiment, particularly, the pressure of the hydrogen gas can be controlled by the pressure-regulating valve RG using the air pressure, and thus the air pressure affects the pressure of the hydrogen gas. Therefore, by assisting the control performed by the control unit 20 by means of the mechanical interaction of the pressure-regulating valve RG and the like, the differential pressure can be eliminated further promptly.

It should be noted that the present invention is not limited to the configurations of the above embodiments, but can be modified in various ways and applied within the scope of the present invention. For example, the embodiments describe the example in which the hydrogen pump 13 is provided in the circulation route R and the hydrogen off-gas is circulated in the hydrogen gas supply line SL by the drive of the hydrogen pump 13, but the present invention is not limited to this example. The present invention can be applied to, for example, a case in which, instead of using the hydrogen pump, a known ejector is provided in the junction of the circulation route R and the hydrogen gas supply line SL, to circulate the hydrogen gas in the hydrogen gas supply line SL by means of the action of the ejector. When employing this configuration, the ejector is provided in the upstream of the pressure-regulating valve RG.

INDUSTRIAL APPLICABILITY

According to the above-described present invention, even when pressure fluctuation (pulsation) occurs in the circulation route, the pressure-regulating means stabilizes the pressure in the downstream, thus minor fluctuation no longer is prevented from occurring in the pressure of the fuel gas supplied to the fuel cell, and the pressure of the fuel gas supplied to the fuel cell is accurately controlled, and as a result power generation can be performed stably.

Moreover, according to the present invention, the differential pressure between the anode electrode side and the cathode electrode side of the fuel cell is controlled to be equal to or less than the predetermined range, thus cross leakage can be prevented as much as possible, and deterioration of the polymer electrolyte membrane, which is caused by excessively large differential pressure, can be suppressed.

In addition, according to the present invention, the pressure of the fuel gas is regulated in accordance with the pressure of the oxidation gas, thus the differential pressure can be eliminated further promptly by elimination of the differential pressure performed by the control means and the interaction of the mechanical operations of the pressure-regulating means.

Therefore, the present invention can be applied to general fuel cell systems which need to be operated stably and in which detection of gas leakage needs to be carried out. Even if such a fuel cell system is loaded in a surface moving body such as a wheeled vehicle, a maritime moving body such as a ship, an underwater moving body such as a submersible vehicle, or an air moving body such as an aircraft, or even if the fuel cell system is installed as an immovable property such as a power-generating plant, the present invention can be utilized.

I claim:

1. A fuel cell system, comprising:
a fuel gas supply line that supplies fuel gas from a fuel gas supply source to the fuel cell;
pressure-regulating means provided on the fuel gas supply line and configured to regulate a pressure of the fuel gas supplied from the fuel gas supply source;
a circulation route configured to return the fuel gas discharged from the fuel cell to the fuel gas supply line;
a fuel gas pump configured to circulate the fuel gas in the circulation route; and
a control unit configured to control the system, wherein
the circulation route is connected to the fuel gas supply line such that the fuel gas is returned to the fuel gas supply line upstream of the pressure-regulating means,
the control unit is configured to output a control signal to the fuel gas pump to control the fuel gas that is circulated in the circulation route, and
the pressure-regulating means is configured such that a pressure of the fuel gas downstream of the pressure-regulating means eases pressure fluctuation of the fuel gas upstream of the pressure-regulating means.

2. The fuel cell system according to claim 1, wherein pressure-regulating means is configured so as to regulate the pressure of the fuel gas in the fuel gas supply line by using a pressure of oxidation gas supplied to the fuel cell, the fuel cell system further comprising:
an oxidation gas supply line for supplying the oxidation gas supplied to a cathode of the fuel cell;
oxidation gas supply means provided in the oxidation gas supply line and for pressurizing and supplying the oxidation gas to the cathode;
cathode side pressure detection means for detecting the pressure of the oxidation gas supplied to the cathode of the fuel cell; and
anode side pressure detection means for detecting the pressure of the fuel gas supplied to an anode of the fuel cell, wherein
the control unit controls the pressure of gas supplied to the fuel cell from at least either the fuel gas supply line and the oxidation gas supply line, so that the differential pressure between the oxidation gas detected by the cathode side pressure detection means and the fuel gas detected by the anode side pressure detection means becomes within a predetermined range.

3. The fuel cell system according to claim 2, wherein the control unit controls at least either one of the oxidation gas supply means or the pressure-regulating means so that the differential pressure becomes within the predetermined range.

4. The fuel cell system according to claim 2, wherein the cathode side pressure detection means estimates and detects the pressure of the oxidation gas on the basis of a drive amount of the oxidation gas supply means.

5. The fuel cell system according to claim 1, wherein the anode side pressure detection means estimates and detects the pressure of the fuel gas on the basis of a drive amount of the fuel gas pump.

6. The fuel cell system according to claim 3, further comprising oxidation gas pressure-regulating means which is separate from the pressure-regulating means and which is capable of controlling a pressure of the oxidation gas supplied to an outlet side of the pressure-regulating means independently from the pressure of an inlet oxidize gas in the cathode side,
wherein when the pressure of the fuel gas is larger than the pressure of the oxidation gas, and the differential pressure therebetween is outside the predetermined range, the oxidation gas pressure-regulating means depressurizes the oxidation gas supplied to the pressure-regulating means, as a result of which the fuel gas in the anode side, which is regulated by the pressure-regulating means, is depressurized, whereby the differential pressure is reduced.

7. The fuel cell system according to claim 3, wherein when the pressure of the fuel gas is larger than the pressure of the oxidation gas, and the differential pressure therebetween is outside the predetermined range, the oxidation gas supply means pressurizes the oxidation gas supplied to the cathode side to reduce the differential pressure.

8. The fuel cell system according to claim 3, further comprising purge means for purging the fuel gas in the circulation route,
wherein when the pressure of the fuel gas is larger than the pressure of the oxidation gas, and the differential pressure therebetween is outside the predetermined range, the purge means depressurizes the fuel gas in the anode side to reduce the differential pressure.

9. The fuel cell system according to claim 3, further comprising oxidation gas pressure-regulating means that is separate from the pressure-regulating means and that is capable of controlling a pressure of the oxidation gas supplied to an outlet side of the pressure-regulating means independently from the pressure of an inlet oxidize gas in the cathode side,     wherein when the pressure of the oxidation gas is larger than the pressure of the fuel gas, and the differential pressure therebetween is outside the predetermined range, the oxidation gas pressure-regulating means pressurizes the oxidation gas supplied to the pressure-regulating means, as a result of which the fuel gas in the anode side, which is regulated by the pressure-regulating means, is pressurized, whereby the differential pressure is reduced.

10. The fuel cell system according to claim 3, wherein when the pressure of the oxidation gas is larger than the pressure of the fuel gas, and the differential pressure therebetween is outside the predetermined range, the oxidation gas supplied to the cathode side is depressurized by the oxidation gas supply means so that the differential pressure is reduced.

\* \* \* \* \*